June 9, 1953 J. A. DRAKE 2,641,105
TEMPERATURE CONTROL SYSTEM HAVING MEANS TO MEASURE
TURBINE INLET TEMPERATURE INDIRECTLY
Filed Oct. 11, 1948 3 Sheets-Sheet 1

INVENTOR.
JOHN A. DRAKE
BY
Mellin and Hanscom
ATTORNEYS

INVENTOR.
JOHN A. DRAKE

Patented June 9, 1953

2,641,105

UNITED STATES PATENT OFFICE 2,641,105

TEMPERATURE CONTROL SYSTEM HAVING MEANS TO MEASURE TURBINE INLET TEMPERATURE INDIRECTLY

John A. Drake, Los Angeles, Calif., assignor to Marquardt Aircraft Company, Van Nuys, Calif., a corporation of California Application October 11, 1948, Serial No. 53,791

12 Claims. (Cl. 60—35.6)

This invention relates to a temperature control system. More particularly, it relates to a temperature control system which is operable to control the turbine inlet temperature of a turbojet engine or of any other engine wherein heat is added to a working fluid in a combustion chamber, and wherein the duct venting the fluid from the combustion chamber is choked.

The invention will first be described with reference to a turbojet engine and its applicability to other engines will be discussed thereafter.

As is well known, a turbojet engine comprises an airframe within which is disposed a compressor, combustion chambers, a turbine, a shaft connecting the turbine and the compressor and an exit nozzle. The outlets of the combustion chambers are choked, i. e., they are of convergent-divergent longitudinal section, so as to accelerate the gases at the turbine inlet. The turbine, besides driving the compressor, may also drive a propeller, and further work is obtained by venting the gases from the turbine through an exit nozzle to obtain a thrust.

In turbojet engines, temperature control at the turbine inlet is important. Thus, with present materials of construction, the turbine inlet temperature should not exceeed about 1500° F.; otherwise, the blades will burn off. But from the standpoint of jet efficiency, a turbine inlet temperature as near 1500° F. as possible should be maintained.

It is apparent that, to achieve maximum efficiency yet avoid mechanical failure, a temperature control system is required which is dependable and accurate and which responds rapidly to changing conditions.

Systems employed heretofore have involved too great a time lag to be satisfactory, or have been inaccurate. Thus, in some cases the time lag has been such as to result in structural damage before the faulty condition has been corrected. Inaccuracies result from such phenomena as the velocity of flow past the thermal element used to measure the critical temperature, radiation from local hot spots, and variation of temperature across the critical region.

Such methods as have been used heretofore have measured the critical temperature more or less directly, resulting in the inaccuracies noted above. Direct measurement of temperature under the conditions prevailing at the inlet of a jet turbine is exceedingly difficult to carry out accurately and rapidly; and rapid translation of such measurement into a mechanical control is likewise exceedingly difficult.

It is an object of the present invention to provide an improved temperature control system for jet engines and other engines wherein heat is added to a working fluid in a combustion chamber and the heated fluid is vented through a choked duct.

It is a further object of the invention to provide an indirect means of measuring temperatures in engines of the character described.

It is a still further object of the invention to provide means of measuring high temperatures at choked exit ducts, such as at the turbine inlet of a turbojet engine, without direct measurement of the temperature at such point, such means being accurate and involving very little time lag.

It is a particular object of the invention to provide a temperature control system for turbojet engines and the like which is rapidly and accurately responsive to temperature variations at critical areas and is operable rapidly to correct conditions to control such temperature.

These and other objects of the invention will be apparent from the ensuing description and the appended claims.

Certain forms which the invention may assume are exemplified in the folowing description and illustrated by way of example in the accompanying drawings, in which.

Figure 1:
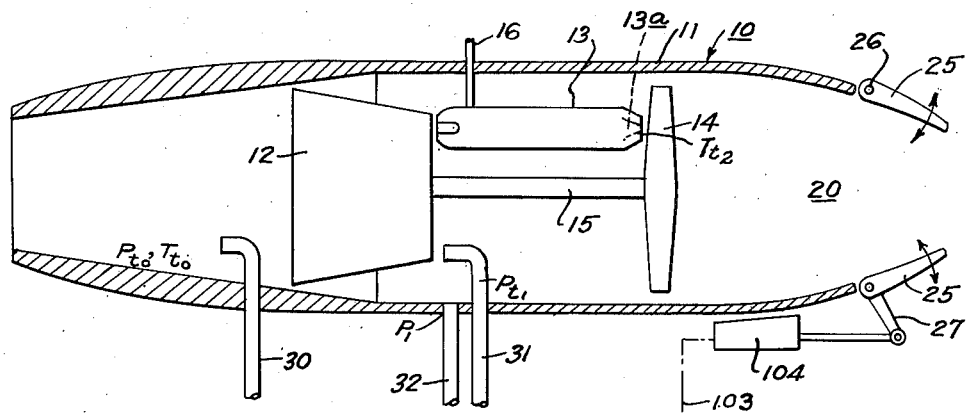
Fig. 1 is a schematic view of a conventional turbojet engine showing diagrammatically only those parts which are essential to an understanding of the invention.

Referring now to Fig. 1, the numeral 10 indicates generally a turbojet engine comprising an air frame 11, a compressor 12, combustion chambers 13 each having a choked or convergent-divergent nozzle 13a, a turbine 14 and a shaft 15 operatively connecting the turbine and compressor. Also shown are a fuel inlet 16, a nozzle section 20 and mechanical means 25, such as vanes pivotally supported at 26, for varying the nozzle area. A linkage 27 is provided for actuating the vanes 25.

The turbojet 10 is also provided with a conduit 30 opening upstream at the compressor inlet, a conduit 31 opening upsteam at the compressor outlet and a conduit 32 also opening into the compressor outlet but in a direction transverse to the air stream, as shown. The purpose of the conduits 30, 31 and 32 is explained hereinafter.

I have discovered that, in the critical operating range, i. e., at high engine R. P. M. and at high turbine inlet temperature, the turbine inlet temperature can be measured indirectly by measuring two pressures and a low temperature.

Before elaborating this point, certain terms will be defined, as follows:

$T_t$ is the total temperature; i. e., temperature as measured in an air stream when the air is brought to rest.

$P_t$ is total pressure; i. e., pressure as measured through a duct opening into an air stream.

P is a static pressure; i. e., pressure as measured by the static pressure orifice of a pitot-static tube.

N is the R. P. M. of the turbine.

$k$ and $C$ are constants.

Subscripts 0, 1 and 2, as in the terms $T_{t_0}$, $P_{t_1}$, $P_1$ and $T_{t_2}$, indicate values of the terms $T_t$, $P_t$ and $P$ at the compressor inlet of Fig. 1, at the compressor outlet or combustion chamber inlet and at the turbine inlet, respectively.

Mathematically stated, the discovery set forth hereinabove is as follows:

$$(1) \quad T_{t_2}(\doteq)\frac{(T_{t_0}+kN^2)P_1}{P_{t_1}-P_1}\cdot C$$

That is, the total temperature at the turbine inlet ($T_{t_2}$) is measured by the total temperature at the compressor inlet, the R. P. M. of the turbine, static pressure at the compressor outlet and total pressure at the compressor outlet.

It will be noted that the variables of which $T_{t_2}$ is a function are two pressures, turbine R. P. M. and a low temperature, each of which can be easily, rapidly and accurately measured. By employing large pressure lines, the lag in measuring these variables can be made almost vanishingly small, and none of them varies rapidly. Thus, $T_{t_0}$ varies only with altitude and flight speed, hence does not vary rapidly, and its measurement is not affected by radiation and temperature gradient errors affecting the direct measurement of $T_{t_2}$.

Equation 1 contains, it will be noted, the term $T_{t_0}+kN^2$. This term is an approximation which is sufficiently accurate for practical purposes. A more rigorous derivation would employ the term $T_{t_1}$; hence, Equation 1 would become $$(2) \quad T_{t_2}=\frac{T_{t_1}P_1}{P_{t_1}-P_1}\cdot C$$

This equation is simpler, as it involves one less unknown quantity. The quantity $T_{t_1}$, like $T_{t_0}$ in Equation 1, is the only temperature measured, and although it is a higher temperature than $T_{t_0}$, it is a much lower temperature and is much more easily measured than $T_{t_2}$.

Figure 2:
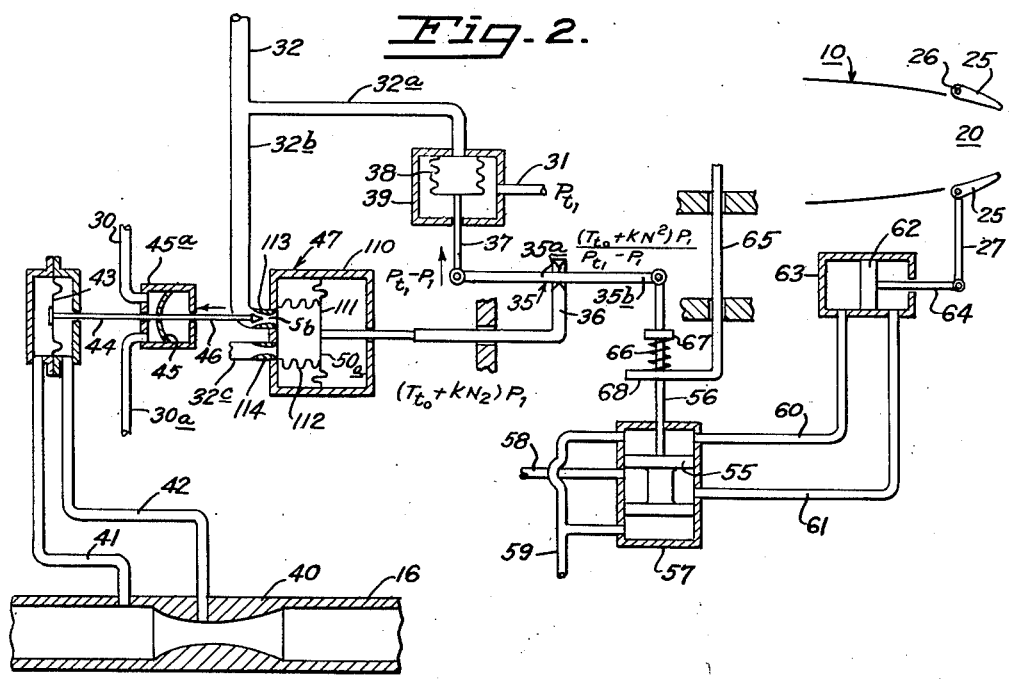
Figs. 2 and 3 are schematic representations of a mechanical system and an electrical system, respectively, each operative to control the turbine inlet temperature.

Referring now to Fig. 2 of the drawings, the conduits 30, 31 and 32 have the same significance as in Fig. 1. A lever 35 is provided having a variable fulcrum 36 and arms 35a and 35b whose lengths are determined by the position of the fulcrum 36. The arm 35a is connected by a rod 37 to a bellows 38 disposed in a gas tight chamber 39. The pressure $P_1$ is communicated to the interior of bellows 38 through a conduit 32a and the pressure $P_{t_1}$ is communicated to the chamber 39 outside the bellows through the conduit 31. It will be seen that an upward force will be exerted on the arm 35a which is proportional to $P_{t_1}-P_1$, thus providing the denominator of the right hand side of Equation 1.

In the fuel line 16 of the turbojet fuel pump (not shown), there is provided a convergent-divergent section 40 which is tapped at its inlet and at its throat by conduits 41 and 42, respectively, as shown. These conduits communicate with opposite sides of a flexible diaphragm 43, which is connected by a rod 44 to the metallic diaphragm 45 of a thermal expansive unit 45a. The duct 30 is in thermal communication with the thermal expansive unit as shown, and is vented through a conduit 30a. The diaphragm 45 is connected to a needle valve 46.

As indicated, the force actuating the needle valve 46 is the sum of two forces, $T_{t_0}$ and $kN^2$, acting in the direction indicated by the arrow. The pressure $P_1$ must be multiplied by the term $T_{t_0}+kN^2$ to provide the numerator of the right hand side of Equation 1. This is accomplished by means of a pressure multiplying device 47, as more fully described in my co-pending application, Serial No. 53,792, filed October 11, 1948, entitled "Pressure Control Device."

Briefly, the pressure multiplying device 47 comprises a gas tight chamber 110 and a flexible diaphragm 111 and a bellows 112 disposed therein as shown. The duct 32b provides the inlet, and a duct 32c provides the outlet, and a choked or convergent-divergent section 113 is disposed in the inlet duct 32b and a similar section 114 is disposed in the outlet duct 32c, as shown. As illustrated, the needle valve 46 controls the throat area, $S_b$, of the section 113. As more fully explained in my said co-pending application, section 114 is larger than section 113 for the operating conditions of turbojets wherein the ratio of pressure across the two sections causes sonic flow at the throat, and supersonic flow in the divergent portion of each section.

As explained in greater detail in my co-pending application above referred to, the pressure in the bellows 112 will, of course, be proportional to $P_1$, and it will also be proportional to $S_b$, the throat area of the section 113. But $S_b$ is proportional to the travel of needle 46, hence is proportional to $T_{t_0}+kN^2$.

It will thus be seen that a force is exerted on the fulcrum 36 which is proportional to $$(T_{t_0}+kN^2)P_1$$

and that, as a consequence, a downward force is exerted on the arm 35b of the lever 35 which is proportional to $$\frac{(T_{t_0}+kN^2)P_1}{P_{t_1}-P_1}$$

The force $(T_{t_0}+kN^2)P_1$, translates the fulcrum 36 to the left or right; the distance is proportional to the force since the bellows 112 acts as a spring. Lever 35a is a first class lever. The displacement of the fulcrum changes the ratio of the lever arms. The displacement up or down of one end is the product the displacement of the other end times the ratio of the lever arms. Therefore, lever 35a acts as a multiplier; it multiplies the quantity $(P_{t_1}-P_1)$ by the lever arm ratio. A downward force on arm 35b and rod 56 proportional to $$\left(\frac{T_{t_0}+kN^2}{P_{t_1}-P_1}\right)P_1$$

is therefore exerted.

To transmit and amplify this force to actuate the vanes 25, a servo piston 55 is provided and is connected to the arm 35b by a rod 56. The servo piston 55 is provided with the usual cylinder 57, hydraulic pressure line 58 and sump lines 59 and with lines 60 and 61 communicating with opposite sides of an actuator piston 62 reciprocable in a cylinder 63. The piston 62 is connected by a rod 64 and the rod 27 to the vanes 25. An operating rod or lever 65 is also provided which is manually operable to vary the compression on a coil spring 66 compressed between a collar 67 on the rod 56 and a collar 68 secured to the rod 65. By setting the rod 65 at the desired value of $T_{t_2}$ as indicated by a suitable calibrated scale (not shown), any desired turbine inlet temperature can be maintained. The rod 65 can, of course, also be used by an operator, such as a pilot in a piloted craft, to override the automatic control.

Figure 3:
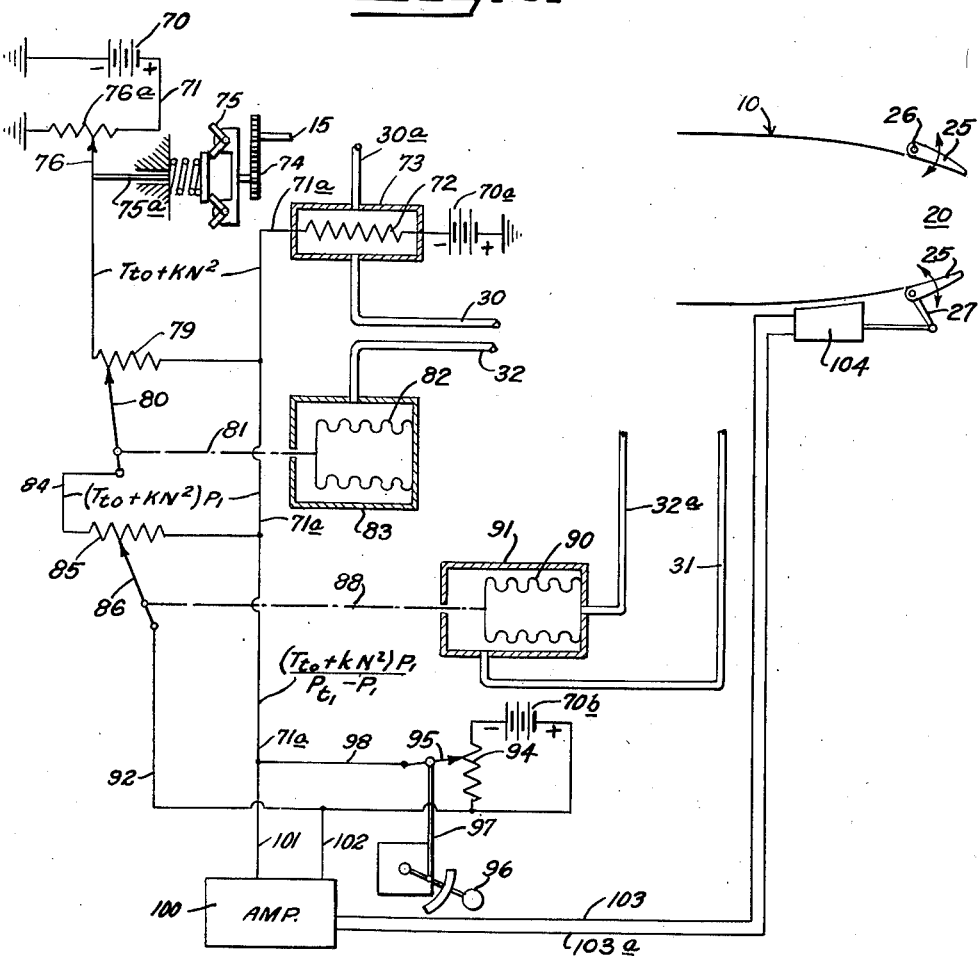

Referring to Figure 3, a resistor 72 is connected to a source of constant voltage 70a, the other terminal of the constant voltage source is connected to ground. The resistor 72 is enclosed in a thermally insulated chamber 73 in communication with duct 30. A vent 30a is also provided. The voltage drop from the constant voltage source 70a to the lead 71a is proportional to the resistance of resistor 72, which in turn is proportional to $T_{t_0}$. Hence as indicated, the voltage from lead 71a to ground is proportional to $T_{t_0}$. To this is added a voltage proportional to $N^2$ in the following manner:

A spring loaded centrifugal flyweight 75 is driven through any suitable mechanical connection indicated generally as 74 by the turbine shaft 15. Through a link 75a, the flyweight 75 actuates the arm 76 of a linear potentiometer 76a connected to a source of constant voltage 70 by a lead 71. It is thus apparent that a voltage from lead 77 to ground proportional to $N^2$, or the square of the rotary speed of the turbine 14, is tapped from the potentiometer 76a. As indicated, the voltage from lead 77 to lead 71a is the sum of two voltages, each proportional to $T_{t_0}$ and $N^2$ respectively. Leads 77 and 71a are connected to either end of a linear potentiometer 79, having an arm 80. The arm 80 is actuated by a rod 81 connected to an evacuated bellows 82 housed in a chamber 83. Chamber 83 is in communication with a conduit 32, hence the voltage between lead 84 and lead 71a is proportional to the product of $P_1$ and the quantity $T_{t_0}+kN^2$. This voltage is divided by a factor proportional to $P_{t_1}-P_1$ by means of a linear potentiometer 85 having an arm 86 which is actuated by the rod 88 connected to a bellows 90. The bellows 90 is housed in a chamber 91, and conduit 32 communicates with the interior of the bellows through a branch conduit 32a, while conduit 31 communicates with the chamber 91 outside the bellows. It is, therefore, apparent that the voltage between lead 92 and lead 71a is proportional to $$\left(\frac{T_{t_0}+kN^2}{P_{t_1}-P_1}\right)P_1$$

From Equation 1 it is seen that the voltage between leads 92 and 71a is proportional to the total temperature ($T_{t_2}$) existing at the turbine inlet nozzle 13a. If this voltage were placed across a voltmeter, $T_{t_2}$ could be read directly from a suitably calibrated scale. However, since the purpose of this system is to automatically regulate $T_{t_2}$ to a selected value, the circuit in Figure 3 is completed through a circuit responsive to the difference between the actual $T_{t_2}$ and the desired value of $T_{t_2}$, and a means to actuate exit nozzle vanes which when moved will change the operating conditions of the turbine, and hence cause the actual $T_{t_2}$ to equal the desired $T_{t_2}$. To select the desired value of $T_{t_2}$, the arm 95 of a potentiometer 94 is manually operated by means of a control lever 96 and linkage 97. The potentiometer 94 is placed across a source of constant voltage 70b. Thus, the voltage between lead 98 and lead 93 is proportional to the control lever setting, which is suitably calibrated with a scale of values of desired $T_{t_2}$. Leads 71a and 98 are connected. Leads 92 and 93 are connected. Thus the voltage between leads 101 and 102 is proportional to the difference between the desired temperature $T_{t_2}$ and the actual temperature $T_{t_2}$. A power amplifier 100 of known type is connected by any suitable electrical, mechanical or hydraulic linkage 103 of known type with a suitable linear actuator 104 of known type to control the vanes 25. The vanes 25 are thus repositioned to the proper position such that the actual $T_{t_2}$ equals the desired $T_{t_2}$.

Figure 4:
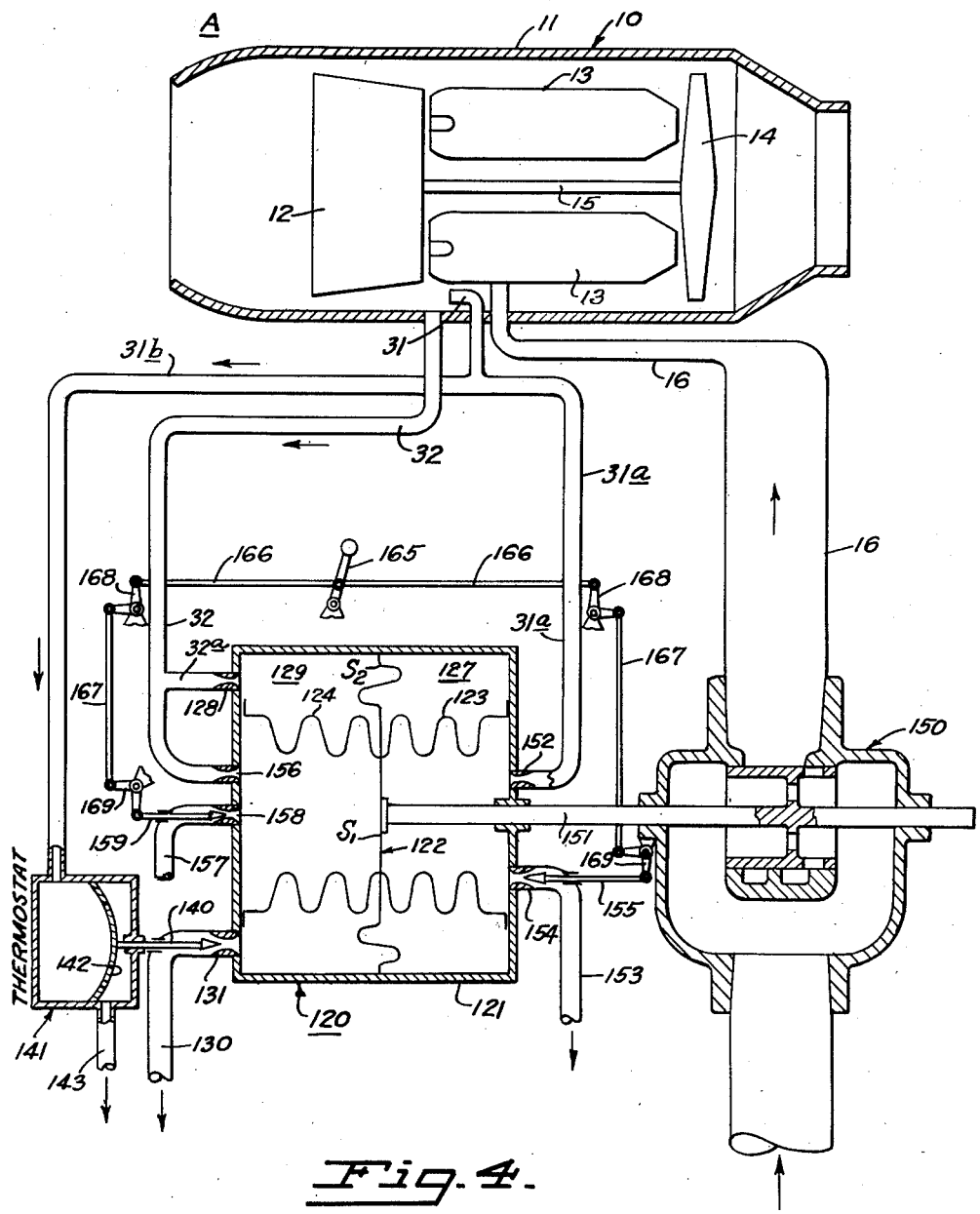
Fig. 4 is a schematic representation of an alternative mechanical control system.

Referring now to Fig. 4, there is shown a mechanical control system which, unlike that of Fig. 2, controls fuel flow rather than the exit nozzle and which solves Equation 2, i. e., $$T_{t_2}=\frac{T_{t_1}P_1}{P_{t_1}-P_1}\cdot C$$

A fuel duct 16 and gas sampling ducts 31 and 32 are provided as in the case of Fig. 1. A pressure multiplying device 120 is also provided comprising a gas tight chamber 121, and a flexible diaphragm 122 and bellows 123 and 124 are disposed therein as shown. The diaphragm is thus divided into a central area $S_1$ exposed to the interior of both bellows and an annuular area $S_2$ external to the bellows. The annuluar space 127 is evacuated and the bellows 123 communicates with a branch duct 31a, thus communicating a pressure $P_{t_1}$ to that bellows and to the diaphragm area $S_1$. Duct 32 communicates with bellows 124, thus communicating pressure $P_1$ to that bellows and to the opposite side of the diaphragm area $S_1$. It will thus be seen that a net force is applied to the diaphragm 122 which is equal to $P_{t_1}-P_1$.

A branch duct 32a having a choked or convergent-divergent section 128 opens into the annular space 129, which is vented through a duct 130 having a choked or convergent-divergent section 131. A needle valve 140, which controls the throat area of the section 131, is actuated by a thermal expansive unit 141 comprising a metallic diaphragm 142 whose expansion and contraction are determined by the temperature $T_{t_1}$ by exposure to gas entering the unit through a duct 31b and leaving through a duct 143.

From the discussion above, with reference to Fig. 2, it will be apparent that the pressure in the annular space 129 will be proportional to $T_{t_1}.P_1$. The diaphragm areas $S_1$ and $S_2$ are so chosen that, when the forces on the diaphragm are in balance, Equation 3 is satisfied:

(3) $\qquad (P_{t_1}-P_1)S_1=T_{t_1}.P_1.S_2$

From this and from Equation 2, Equation 4 follows:

(4) $\qquad T_{t_2}=\frac{T_{t_1}\cdot P_1}{P_{t_1}-P_1}=\frac{S_1}{S_2}C$

As also shown in Fig. 4, a valve 150 is provided in the fuel line 16 and is actuated, through a valve stem 151, by the diaphragm 122. It will, therefore, be apparent that, should $T_{t_2}$ drop below the desired value, the resulting unbalance of forces acting on the diaphragm 122 will open the valve 150 wider. Conversely, if $T_{t_2}$ exceeds the desired value, the valve 150 will be moved toward closed position. In either case, the fuel flow will be throttled to restore the system to the desired operating conditions.

Means is also provided for setting the control system of Fig. 4 at any desired value of $T_{t_2}$. Thus, as shown, the duct 31a opens into bellows 123 through a convergent-divergent section 152 and a vent 153 is provided also having a convergent-divergent section 154, which is controlled by a needle valve 155. Similar means are provided for the bellows 124, as shown, including a choked section 156 in inlet duct 32, and an outlet duct 157 having a choked section 158 controlled by a needle valve 159. Both needle valves 155 and 159 are controlled by a control lever 165 through links 166, 167 and bell crank levers 168, 169, such that the needle valves 155 and 159 are moved together an equal amount to open or close the throats of the sections 154 and 158. It will be apparent that, by moving control lever 165, the force on diaphragm 122 (which is proportional to the value of $P_{t_2}-P_1$). Thus, the lever 165 can be set to maintain the turbine inlet temperature, $T_{t_2}$, at any desired value.

There have been thus described three systems for controlling turbine inlet temperature of a turbojet by automatic and indirect means. Other systems will be apparent to one skilled in the art, and it will also be apparent that the same principles and means are applicable in the case of any engine of the through flow type, wherein heat is added to a working fluid, as by combustion in a combustion chamber, and the hot fluid is vented through a convergent-divergent or choked duct where it attains sonic velocity or a Mach number of unity.

It will, therefore, be apparent that the control system is applicable to a ram jet engine, to any gas turbine satisfying the criteria mentioned, and to all engines of the type mentioned whether useful work is taken in the form of thrust of a jet as in the nozzle of a jet engine, or as the kinetic energy of a turbine, which may drive a propeller, wheels, etc. It will also be apparent that the temperature controlled, i. e., the temperature of gases from a choked exit duct of a combustion chamber, may have an optimum value varying within a wide range and dependent upon a particular set of circumstances. Also, instead of controlling such temperature by controlling the area of an exit nozzle or the flow of fuel, it may be controlled by other means such as varying the pitch of a propeller or the back E. M. F. of a generator.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A control system for a turbojet engine having in flight a compressor inlet temperature of $T_{t_0}$, a compressor outlet total and static pressure of $P_{t_1}$ and $P_1$, a turbine rotary speed of N and a turbine inlet total temperature of $T_{t_2}$, said system comprising pressure responsive means including a pitot tube and a static tube responsive respectively to $P_{t_1}$ and $P_1$, and exerting a first force proportional to $P_{t_1}-P_1$, means responsive to $T_{t_0}$ and N and exerting a second force proportional to $T_{t_0}+kN^2$, where $k$ is a constant, means responsive to said second force and to $P_1$ and exerting a third force proportional to $(T_{t_0}+kN^2)P_1$, and means for dividing said third force by said first force to obtain a force proportional to $T_{t_2}$.

2. A control system for a turbojet engine having in flight a compressor inlet temperature of $T_{t_0}$, compressor outlet total and static pressures of $P_{t_1}$ and $P_1$, a turbine rotary speed of N and a turbine inlet total temperature of $T_{t_2}$, said system comprising means responsive to $P_{t_1}$ and $P_1$, and exerting a first force proportional to $P_{t_1}-P_1$, means responsive to $T_{t_0}$ and N and exerting a second force proportional to $T_{t_0}+kN^2$, where $k$ is a constant, means responsive to said second force and to $P_1$ and exerting a third force proportional to $(T_{t_0}+kN^2)P_1$, means for dividing said third force by said first force to obtain a force proportional to $T_{t_2}$, settable means for bucking the last named force in accordance with the manner of setting the settable means, and means for applying the resultant force to control the inlet temperature of the turbine.

3. A control system for a turbojet engine having in flight a compressor inlet temperature of $T_{t_0}$, a compressor outlet total and static pressures of $P_{t_1}$ and $P_1$, a turbine rotary speed of N and a turbine inlet total temperature of $T_{t_2}$, said system comprising pressure responsive means including a pitot tube and a static tube responsive respectively to $P_{t_1}$ and $P_1$, and exerting a first force proportional to $P_{t_1}-P_1$, means responsive to $T_{t_0}$ and N and exerting a second force proportional to $T_{t_0}+kN^2$, where $k$ is a constant, means responsive to said second force and to $P_1$ and exerting a third force proportional to $(T_{t_0}+kN^2)P_1$, and means for dividing said third force by said first force to obtain a force proportional to $T_{t_2}$, and settable means for bucking the last named force in accordance with the manner of setting the settable means, and means for applying the resultant force to control the inlet temperature of the turbine.

4. A control system for a turbojet engine having in flight a compressor inlet temperature of $T_{t_0}$, a compressor outlet total and static pressures of $P_{t_1}$ and $P_1$, a turbine rotary speed of N and a turbine inlet total temperature of $T_{t_2}$, said system comprising means responsive to $P_{t_1}$ and $P_1$, and exerting a first force proportional to $P_{t_1}-P_1$, means responsive to $T_{t_0}$ and N and exerting a second force proportional to $T_{t_0}+kN^2$, where $k$ is a constant, the last named means including a pressure responsive means responsive to N connected in tandem with a temperature responsive element responsive to $T_{t_0}$, means responsive to said second force and to $P_1$ and exerting a third force proportional to $(T_{t_0}+kN^2)P_1$, and means for dividing said third force by said first force to obtain a force proportional to $T_{t_2}$.

5. A control system for a turbojet engine having in flight a compressor inlet temperature of $T_{t_0}$, a compressor outlet total and static pressures of $P_{t_1}$ and $P_1$, a turbine rotary speed of N and a turbine inlet total temperature of $T_{t_2}$, said system comprising pressure responsive means including a pitot tube and a static tube responsive respectively to $P_{t_1}$ and $P_1$, and exerting a first force proportional to $P_{t_1}-P_1$, means responsive to $T_{t_0}$ and N and exerting a second force proportional to $Tt_0+kN^2$, where $k$ is a constant, the last named means including a pressure responsive means responsive to N connected in tandem with a temperature responsive element responsive to $T_{t_0}$, means responsive to said second force and to $P_1$ and exerting a third force proportional to $(Tt_0+kN^2)P_1$, and means for dividing said third force by said first force to obtain a force proportional to $T_{t_2}$.

6. A control system for a turbojet engine having in flight a compressor inlet temperature of $T_{t_0}$, a compressor outlet total and static pressures of $P_{t_1}$ and $P_1$, a turbine rotary speed of N and a turbine inlet total temperature of $T_{t_2}$, said system comprising means responsive to $P_{t_1}$ and $P_1$, and exerting a first force proportional to $P_{t_1}-P_1$, means responsive to $T_{t_0}$ and N and exerting a second force proportional to $Tt_0+kN^2$, where $k$ is a constant, the last named means including a pressure responsive means responsive to N connected in tandem with a temperature responsive element responsive to $T_{t_0}$, means responsive to said second force and to $P_1$ and exerting a third force proportional to $(Tt_0+kN^2)P_1$, and means for dividing said third force by said first force to obtain a force proportional to $T_{t_2}$, and settable means for bucking the last named force in accordance with the manner of setting the settable means, and means for applying the resultant force to control the inlet temperature to the turbine.

7. A control system for a turbojet engine having in flight a compressor inlet temperature of $T_{t_0}$, a compressor outlet total and static pressures of $P_{t_1}$ and $P_1$, a turbine rotary speed of N and a turbine inlet total temperature of $T_{t_2}$, said system comprising pressure responsive means including a pitot tube and a static tube responsive respectively to $P_{t_1}$ and $P_1$, and exerting a first force proportional to $P_{t_1}-P_1$, means responsive to $T_{t_0}$ and N and exerting a second force proportional to $Tt_0+kN^2$, where $k$ is a constant, the last named means including a pressure responsive means responsive to N and connected in tandem with a temperature responsive element responsive to $T_{t_0}$, means responsive to said second force and to $P_1$ and exerting a third force proportional to $(Tt_0+kN^2)P_1$, means for dividing said third force by said first force to obtain a force proportional to $T_{t_2}$, settable means for bucking the last named force in accordance with the manner of setting of the settable means, and means for applying the resultant force to control the inlet temperature to the turbine.

8. A control system for a turbojet engine having mechanically operable means for governing turbine inlet temperature and having in flight a compressor inlet temperature of $T_{t_0}$, compressor outlet total and static pressures of $P_{t_1}$ and $P_1$, a turbine rotary speed of N and a turbine inlet total temperature of $T_{t_2}$, said system comprising hydraulic means for actuating said governing means and control means for said hydraulic means, said control means comprising means responsive to $P_{t_1}$ and $P_1$, and exerting a first force proportional to $P_{t_1}-P_1$, means responsive to $T_{t_0}$ and N and exerting a second force proportional to $Tt_0+kN^2$, where $k$ is a constant, means responsive to said second force and to $P_1$ and exerting a third force proportional to $(Tt_0+kN^2)P_1$, means for dividing said third force by said first force to obtain a force proportional to $T_{t_2}$, and mechanical means responsive to said last named force for actuating said hydraulic means.

9. A control system for a turbojet engine having mechanically operable means for governing turbine inlet temperature and having in flight a compressor inlet temperature of $T_{t_0}$, compressor outlet and total static pressures of $P_{t_1}$ and $P_1$, a turbine rotary speed of N and a turbine inlet total temperature of $T_{t_2}$, said system comprising hydraulic means for actuating said governing means and control means for said hydraulic means, said control means comprising pressure responsive means including a pitot tube and a static tube responsive respectively to $P_{t_1}$ and $P_1$, and exerting a first force proportional to $P_{t_1}-P_1$, means responsive to $T_{t_0}$ and N and exerting a second force proportional to $Tt_0+kN^2$, where $k$ is a constant, means responsive to said second force and to $P_1$ and exerting a third force proportional to $(Tt_0+kN^2)P_1$, means for dividing said third force by said first force to obtain a force proportional to $T_{t_2}$, and mechanical means responsive to the last named force for actuating said hydraulic means.

10. A control system for a turbojet engine having mechanically operable means for governing turbine inlet temperature and having in flight a compressor inlet temperature of $T_{t_0}$, compressor outlet total and static pressures of $P_{t_1}$ and $P_1$, a turbine rotary speed of N and a turbine inlet total temperature of $T_{t_2}$, said system comprising hydraulic means for actuating said governing means and control means for said hydraulic means, said control means comprising means responsive to $P_{t_1}$ and $P_1$, and exerting a first force proportional to $P_{t_1}-P_1$, means responsive to $T_{t_0}$ and N and exerting a second force proportional to $Tt_0+kN^2$, where $k$ is a constant, means responsive to said second force and to $P_1$ and exerting a third force proportional to $(Tt_0+kN^2)P_1$, means for dividing said third force by said first force to obtain a force proportional to $T_{t_2}$, settable means for bucking the last named force in accordance with the manner of setting the settable means, and mechanical means for applying the resultant force to actuate the hydraulic means.

11. A control system for a turbojet engine having in flight a compressor inlet temperature of $T_{t_0}$, compressor outlet total and static pressures of $P_{t_1}$ and $P_1$, a turbine rotary speed of N and a turbine inlet total temperature of $T_{t_2}$, said system comprising means responsive to $P_{t_1}$ and $P_1$, and exerting a first force proportional to $P_{t_1}-P_1$, means responsive to $T_{t_0}$ and N and exerting a second force proportional to $Tt_0+kN^2$, where $k$ is a constant, means responsive to said second force and to $P_1$ and exerting a third force proportional to $(Tt_0+kN^2)P_1$, and means for dividing said third force by said first force to obtain a force proportional to $T_{t_2}$.

12. A control system for a turbojet engine having mechanically operable means for governing turbine inlet temperature and having in flight a compressor inlet temperature of $T_{t_0}$, compressor outlet total and static pressures of $P_{t_1}$ and $P_1$, a turbine rotary speed of N and a turbine inlet total temperature of $T_{t_2}$, said system comprising hydraulic means for actuating said governing means and control means for said hydraulic means, said control means comprising pneumatic means responsive to $P_{t_1}$ and $P_1$ and exerting a first force proportional to $P_{t_1}-P_1$, a thermal expansive member responsive to $T_{t_0}$ and exerting a second force proportional thereto, pneumatic means responsive to fuel flow and exerting a third force proportional to $N^2$, pneumatic means responsive to $P_1$ and to the sum of said second and third forces and exerting a fourth force proportional to $(Tt_0+kN^2)P_1$, and mechanical means responsive to said first and fourth forces for exerting on said hydraulic means a force proportional to $$\frac{(T_{t_0}+kN^2)P_1}{P_{t_1}-P_1}$$

JOHN A. DRAKE.

References Cited in the file of this patent

UNITED STATES PATENTS

| Number | Name | Date |
|---|---|---|
| 1,455,633 | Lundgaard | May 15, 1923 |
| 2,411,895 | Poole | Dec. 3, 1946 |
| 2,427,835 | Campbell | Sept. 23, 1947 |
| 2,457,595 | Orr | Dec. 28, 1948 |
| 2,463,566 | Saldin | Mar. 8, 1949 |
| 2,479,813 | Chamberlin | Aug. 23, 1949 |
| 2,559,623 | Holmes | July 10, 1951 |

FOREIGN PATENTS

| Number | Country | Date |
|---|---|---|
| 560,196 | Great Britain | Mar. 24, 1944 |